United States Patent [19]

Kass, deceased et al.

[11] 3,976,096
[45] Aug. 24, 1976

[54] VALVE

[75] Inventors: Gerald H. Kass, deceased, late of Garden City, Mich., by Frederick O. Knauer, administrator, Detroit, Mich.

[73] Assignee: Anderson Brass Company, Detroit, Mich.

[22] Filed: Dec. 18, 1974

[21] Appl. No.: 533,936

Related U.S. Application Data

[62] Division of Ser. No. 390,101, Aug. 20, 1974, abandoned.

[52] U.S. Cl. .......................... 137/493.2; 137/493.9; 137/516.25
[51] Int. Cl.² .................... F16K 17/04; F16K 17/18
[58] Field of Search.............. 137/493, 493.1, 493.2, 137/493.6, 102, 512.2, 516.25

[56] References Cited
UNITED STATES PATENTS 2,431,457 11/1947 Bondurant ...................... 137/493.2
2,966,917 1/1961 Bloom............................. 137/102 X
2,995,148 8/1961 Novak et al. ................ 137/493.6 X
3,067,770 12/1962 Fancher .............................. 137/493
3,074,423 1/1963 Cox et al. ....................... 137/493 X
3,439,583 4/1969 Stacey.......................... 137/493.6 X Primary Examiner—Martin P. Schwadron
Assistant Examiner—Robert J. Miller
Attorney, Agent, or Firm—Harness, Dickey & Pierce

[57] ABSTRACT

A relief/check valve wherein a relief valve element is displaced to open the valve when the inlet pressure exceeds the outlet pressure by a predetermined relief pressure. The relief valve element carries an elastomeric check valve element which permits reverse flow when the outlet pressure exceeds the inlet pressure. The invention is applicable to fuel tank vent valves and fuel line anti-siphon valves.

7 Claims, 4 Drawing Figures

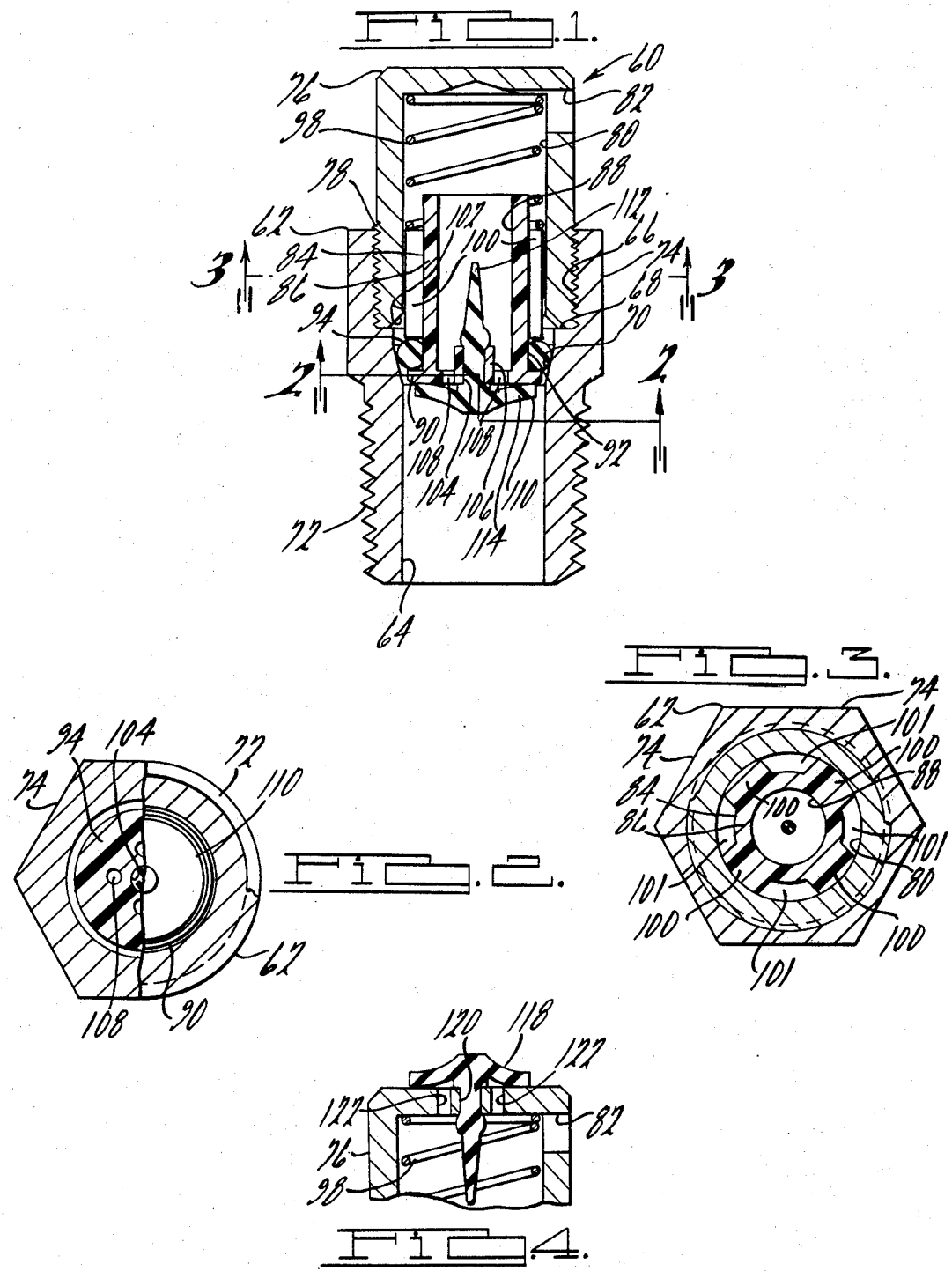

VALVE

This is a division of application Ser. No. 390,101, filed Aug. 20, 1974 now abandoned.

BACKGROUND AND SUMMARY OF THE INVENTION

The present invention relates to a relief/check valve construction particularly useful with land vehicle and marine fuel systems.

In certain fuel supply systems it is often desirable to use an anti-siphon valve in the fuel supply line from the fuel tank to the carburetor. This valve is essentially a relief valve which opens when the fuel pump operates to permit uni-directional flow from the tank to the carburetor. When the pump ceases, the valve closes against the fuel head in the tank to prevent the fuel in the tank from being siphoned to the carburetor where it can leak into the engine compartment. One of the problems which has been observed with the use of an anti-siphon valve concerns fuel expansion in the carburetor. Since the relief valve prevents reverse flow to the tank, the expanding fuel can only overflow the carburetor, thereby causing several problems, such as fire hazard, undesirable vapor emissions, potential engine flooding, etc. Since the preferred relief valve previously used for fuel line anti-siphon purpose is dimensionally compact, it initially appeared that the problem of fuel expansion could not be solved without complicating the fuel supply circuit or increasing the size of the anti-siphon valve.

One of the objects of the present invention, therefore, is to provide an improved relief/check valve which, when utilized as an anti-siphon valve for a fuel supply system, solves the aforementioned problem without increasing either the size of the previous anti-siphon valve or the complexity of the fuel supply circuit, and yet which will handle the requisite flow rates.

In another aspect, the present invention is applicable to an improvement in fuel tank vent valves. Prior fuel tank vent valves are essentially normally closed relief/check valves which open under pre-determined conditions to prevent vacuum or excessive pressure in the fuel tank. The check valve element opens to let air enter the tank as fuel is withdrawn, and the relief valve element opens to vent the tank to atmosphere when the fuel vapor pressure becomes too high. One of the problems with prior fuel tank vent valves is that they do not provide adequate safety in the event of a vehicle crash which crushes the fuel tank. In such an event, it is possible for the crushing of the tank to raise the pressure therein to relatively high pressures (e.g. 15, psi or greater), which results in liquid fuel escaping in large quantities via the vent valve. This problem is aggravated in the case of aluminum fuel tanks, which barrier tests have shown to collapse more readily than steel tanks.

Another object of the present invention, therefore, is to provide an improved relief/check valve which is particularly suited for use as a fuel tank vent valve, but which avoids the aforementioned leakage problems to which aluminum fuel tanks are particularly subject.

The present invention solves the aforementioned problems without adversely increasing the size of and with only minimal revision to presently available valves. The valves according to the present invention provide reliable operation at minimum cost and hence are well suited for mass production applications.

Additional objects, features, advantages, and benefits of the invention will be seen in the ensuing description and claims, which are to be taken in conjunction with the accompanying drawing. The drawing illustrates several preferred embodiments of the invention in accordance with the best modes presently contemplated for carrying out the invention.

BRIEF DESCRIPTION OF THE DRAWING

FIG. 1 is a longitudinal sectional view through a valve according to the present invention.

FIG. 2 is a transverse sectional view taken along line 2—2 in FIG. 1.

FIG. 3 is a transverse sectional view taken along line 3—3 in FIG. 1.

FIG. 4 is a longitudinal sectional view through a portion of a modified valve according to the present invention.

DESCRIPTION OF THE PREFERRED EMBODIMENTS

Valve 60 comprises a generally cylindrical body 62 having a central cylindrical bore 64, the upper end of which (as viewed in FIG. 1) is counterbored and threaded as at 66 to provide a shoulder 68 within the bore. The portion of bore 64 just below shoulder 68 is of conical shape to form a valve seat 70. The lower end of bore 64 is the valve inlet for relief valve element 84, which carries O-ring 94 which is normally held on seat 70 by spring 98. The O.D. of such inlet, which acts as a safety or relief inlet, is threaded at 72. The upper portion 74 of body 62 is polygonally shaped so that the valve can be easily tightened for connection to a threaded female fitting on the fuel tank. A hollow, cylindrical cap 76 is threaded fully into counterbore 66 by means of a thread 78 extending around the outside of the lower end of the cap. Cap 76 comprises a central circular bore 80 which is coaxial with bore 64 and of approximately the same diameter. A radial bore 82 extends through the side wall of cap 76 to intercept the upper end of bore 80 and to thereby form the safety or relief outlet. The hollow, cylindrical relief valve element 84 is disposed within bore 80 for axial displacement therein. Valve element 84 comprises a tubular side wall 86 defining a central circular bore 88. An end wall 90 extends across bore 88 at the lower end of element 84, the upper end of bore 88 being open. The lower end of element 84 protrudes outwardly through the lower end of bore 80. A groove 92 extends around the protruding end of element 84, and an O-ring seal 94 is disposed in groove 92. The O.D. of side wall 86 is somewhat less than the diameter of bore 80. A plurality of four circumferentially spaced axial ribs 100 are provided on the outside of wall 86 to guide element 84 for axial displacement within bore 80. Ribs 100 in cooperation with the side wall of cap 76 define a plurality of four axial channels 101 extending from groove 92 to the open upper portion of bore 80. Ribs 100 stop short of the upper end of side wall 86. A helical compression spring 98 disposed within bore 80 and interengaged between the top of cap 76 and the upper ends of ribs 100 forcibly biases valve element 84 downwardly relative to body 62 and cap 76 so that seal 94 seats on seat 70. With element 84 so seated, flow through the valve from bore 64 to bore 82 is blocked. A second valve seat 102 for the O-ring 94 is provided at the lower end of cap 76 around bore 80. A central circular hole 104 extends through end wall 90. An annular circular lip 106 is provided around hole 104 on the inside of end wall 90. A plurality of additional holes 108 are provided in end wall 90 around hole 104. An elastomeric check valve element 110 in the form of an umbrella-type valve (available from Vernay Laboratories, Inc., of Yellow Springs, Ohio) is mounted on end wall 90. Valve 110, which is similar to that shown in U.S. Lets. Pat. No. 3,159,176, comprises a stem 112 and a cap 114 on the lower end of stem 112. Stem 112 is inserted through hole 104 and is retained thereon by means of an enlarged bead on the stem. Cap 114 substantially covers the outside of end wall 90 with the peripheral edge thereof being forcibly sealed in continuous peripheral contact with end wall 90 radially outwardly beyond holes 108. FIG. 1 illustrates the normal position of the various valve elements.

Valve 60 operates as follows when used as a fuel tank vent valve. As fuel is withdrawn from the fuel tank to which valve 60 is connected, the vapor pressure drops below atmospheric pressure. At a minimum pressure differential (approximately ¼ psi), the outer periphery of cap 114 unseals from end wall 90, thereby opening the check valve 110. This permits air to enter via bores 82, 80, and 88, openings 108, and bore 64, to relieve the partial vacuum in the tank and permit continued pumping of fuel from the tank. On the other hand, should the tank vapor pressure increase beyond a predetermined pressure relative to atmosphere which could damage the fuel tank (approximately 1 psi), relief valve element 84 unseats from seat 70 so that fuel vapor is vented via bore 64, through the annular space between seal 94 and seat 70, through channels 101 and via bores 80 and 82. Venting is prevented below this pressure in order to reduce undesirable fuel vapor emissions. When the excess pressure is relieved, element 84 again seats on seat 70. In the event of an accident, and crushing of the fuel tank, valve 60 also prevents the gross escape of liquid fuel through the valve under the influence of crash-induced high pressures in the tank. This results from the fact that the presence of higher than normal pressures at the valve inlet will cause relief valve element 84 to move even farther against the bias of spring 98 to seat seal 94 on seat 102. In this position, element 84 again blocks flow through the valve so that it is impossible for liquid fuel to squirt from the tank through the valve. By way of example, if the normal operating range is 0–6 psi, then the valve will be designed to seat element 84 on seat 102 at about 6 psi.

In certain fuel systems, bore 82 may not open directly to atmosphere but rather may be connected to a carbon canister. In this case, additional advantages may be obtained by mounting an umbrella-type valve 118 with suitable mounting and venting holes 120, 122 on the top of cap 76 as shown in FIG. 4. Since the carbon canister imposes a certain back pressure on the venting fuel vapors, the fuel tank vapor pressure, under certain conditions, might rise to a valve sufficient to seat element 84 on seat 102 (thereby closing the valve). The provision of valve element 118 obviates this problem. Valve 118 is arranged to open and thereby vent the tank directly to atmosphere when the fuel vapor pressure reaches a value exceeding the pressure for unseating element 84 from seat 70, but less than the pressure for seating element 84 on seat 102.

It will be appreciated that the invention disclosed herein may be used in other applications where similar operation and function are required, and that if used in a fuel line from a tank to an engine or other destination, the fuel inlet would be into the upper end of bore 80 and out through bore 64. In any event this is the normal operative direction of flow, while a reverse flow occurs when back pressure occurs which is not above a predetermined value, but if the back pressure exceeds such value, the valve closes fully, by the seating of O-ring 94 against seat 102. The particular details of a valve according to the present invention (i.e., dimensions, spring rates, flow rates, etc.) can be arrived at by utilization of well-known design principles known to those skilled in the art.

It is to be understood that the foregoing description is that of a preferred embodiment of the invention. Various changes and modifications may be made without departing from the spirit and scope of the invention as defined by the appended claims.

What is claimed is:

1. A fluid flow-controlling valve comprising valve body, a central cylindrical bore in said body with one end thereof being the normal valve inlet and the other end the normal valve outlet, a valve seat extending around said bore, a hollow cylindrical relief valve element coaxial with and arranged for axial displacement within said bore, said relief valve element having an axial passage therein, an end wall at one end of said relief valve element extending transversely of the passage thereof, the other end of said relief valve element passage being open, a groove extending around the outside of said relief valve element, an O-ring seal in said groove, a coil spring for biasing said relief valve element to seat said seal on said valve seat and yieldably oppose reverse flow through said valve, said relief valve element being displaced against the bias of said spring to unseat said O-ring seal from said valve seat in response to an outlet pressure which exceeds the inlet pressure by a first predetermined value whereby fluid may flow from said valve outlet to said valve inlet, an opening extending through said end wall of said relief valve element, an elastomeric check valve element carried by said end wall and including a supporting portion projecting through said end wall to the interior of said passage and cooperable with said opening to permit fluid flow from the valve inlet to the valve outlet when the inlet pressure exceeds the outlet pressure, and a second valve seat for said O-ring seal spaced from said first-mentioned seat and against which said O-ring seal is seated when the outlet pressure exceeds the inlet pressure by a second predetermined value which is greater than said first predetermined value to thereby cooperate with said check valve to block flow through the valve in both directions.

2. The flow-controlling valve of claim 1 wherein said valve body and said relief valve element are arranged and constructed such that a plurality of axially extending channels are defined between said relief valve element and said bore of said body, said channels extending axially from said O-ring seal toward said normal valve inlet, fluid flow from the normal valve outlet to said inlet being via said channels.

3. The flow-controlling valve of claim 1 wherein said check valve element comprises an umbrella-type valve.

4. The flow-controlling valve of claim 1 further including an opening in said valve body adjacent said normal valve inlet to communicate said valve body bore to space exterior of said valve body and a second elastomeric check valve element carried by said valve body and cooperable with said last-mentioned opening to permit fluid flow from said valve body bore to said exterior space when the pressure acting on said second check valve element exceeds the pressure acting on said relief falve element by a predetermined amount.

5. A vehicle fuel tank relief/check valve with safety closure for preventing escape of liquid fuel therethrough when the tank is crushed, said valve comprising a valve body, a cylindrical bore in said body, said bore being open at one end thereof, the valve inlet being at the other end thereof, a valve seat extending around said bore and disposed axially between the ends of said bore, a cylindrical cap comprising a cylindrical bore, said cap being open at one end thereof, the valve inlet being at the other end thereof, said cap being secured at its open end to said body bore, a second valve seat extending around said cap bore, a cylindrical relief valve element arranged for axial displacement within said cap bore, said relief valve element comprising a central cylindrical bore, an end wall at one end of said relief valve element extending across the bore thereof, the other end of said relief element bore being open, said one end of said relief valve element protruding from said cap bore at said open end of said cap, a groove extending around the outside of said relief valve element axially inwardly relative to the end wall thereof, an O-ring seal disposed in said groove, a coil spring disposed within said cap bore and interengaged between said cap and said relief valve element for biasing said relief valve element outwardly of said cap bore relative to said open end of said cap to seat said seal on said first valve seat, said relief valve element blocking flow from the outlet to the inlet when said seal is seated on said first seat, said relief valve element being displaced bodily against said spring to unseat said O-ring seal from said first valve seat when outlet pressure exceeds inlet pressure by a predetermined amount to provide a fluid path through the valve from outlet to inlet when said relief valve element is unseated, said relief valve element being displaced bodily against said spring to seat said O-ring seal on said second valve seat when outlet pressure exceeds inlet pressure by a predetermined amount which is greater than said first amount, said relief valve element blocking flow through the valve when seated on said second seat.

6. The vehicle fuel tank relief/check valve of claim 5 further including an opening extending through said end wall, an elastomeric check valve element carried by said end wall and cooperable with said end wall opening to block reverse flow through said end wall opening from the valve outlet to the valve inlet when outlet pressure exceeds inlet pressure by a predetermined amount.

7. The valve of claim 6 including a plurality of openings extending through said end wall of said relief valve element, said check valve element being an umbrella-type valve having a cap on the outside of said end wall and biased against the outside of said end wall to cover said openings.

* * * * *

UNITED STATES PATENT AND TRADEMARK OFFICE
CERTIFICATE OF CORRECTION

PATENT NO. : 3,976,096
DATED : August 24, 1976
INVENTOR(S) : Gerald H. Kass

It is certified that error appears in the above-identified patent and that said Letters Patent are hereby corrected as shown below:

Abstract page, under Related U.S. Application Data, filing date "Aug. 20, 1974" should be --Aug. 20, 1973--.
Col. 1, line 3, "filed Aug. 20, 1974" should be --filed Aug. 20, 1973--.
Col. 3, line 58, "valve" should be --value--.
Col. 5, line 4 (Claim 4, line 10), "falve" should be --valve--.

Signed and Sealed this

Ninth Day of November 1976

[SEAL]

Attest:

RUTH C. MASON
Attesting Officer

C. MARSHALL DANN
Commissioner of Patents and Trademarks